(12) United States Patent
Han et al.

(10) Patent No.: US 11,099,397 B2
(45) Date of Patent: Aug. 24, 2021

(54) OVERHANG ROTATABLE MULTI-SENSORY DEVICE AND A VIRTUAL REALITY MULTI-SENSORY SYSTEM COMPRISING THE SAME

(71) Applicant: TAINAN NATIONAL UNIVERSITY OF THE ARTS, Tainan (TW)

(72) Inventors: Ping-Hsuan Han, Tainan (TW); Yang-Sheng Chen, Tainan (TW); Jui-Chun Hsiao, Tainan (TW); Yi-Ping Hung, Tainan (TW)

(73) Assignee: TAINAN NATIONAL UNIVERSITY OF THE ARTS, Tainan (TW)

( * ) Notice: Subject to any disclaimer, the term of this patent is extended or adjusted under 35 U.S.C. 154(b) by 163 days.

(21) Appl. No.: 16/294,545

(22) Filed: Mar. 6, 2019

(65) Prior Publication Data

US 2019/0293946 A1 Sep. 26, 2019

Related U.S. Application Data

(60) Provisional application No. 62/647,641, filed on Mar. 24, 2018.

(51) Int. Cl.
*G06F 3/0346* (2013.01)
*G02B 27/01* (2006.01)
*A42B 3/04* (2006.01)
*F16M 13/02* (2006.01)
*G06F 3/01* (2006.01)

(52) U.S. Cl.
CPC ........ *G02B 27/0176* (2013.01); *A42B 3/0406* (2013.01); *F16M 13/022* (2013.01); *G06F 3/011* (2013.01); *G02B 2027/0154* (2013.01); *G02B 2027/0163* (2013.01)

(58) Field of Classification Search
CPC ............ G02B 27/0176; G02B 27/0163; G02B 27/017; G06F 3/011; B25J 18/06; G05B 15/02; G08B 21/18; G06T 19/006; F16M 13/022; G03B 17/561
USPC .................. 340/540; 700/258; 345/333, 156; 463/31; 703/6
See application file for complete search history.

(56) References Cited

U.S. PATENT DOCUMENTS

| | | | | |
|---|---|---|---|---|
| 7,812,815 B2 * | 10/2010 | Banerjee | ................. | G06F 3/011 345/156 |
| 8,364,312 B2 * | 1/2013 | Tobey | ...................... | B25J 18/06 700/258 |

(Continued)

*Primary Examiner* — Audrey Y Chang
(74) *Attorney, Agent, or Firm* — Rabin & Berdo, P.C.

(57) ABSTRACT

A virtual reality multi-sensory system includes an overhang rotatable multi-sensory device and a head-mounted multi-sensory device. The overhang rotatable multi-sensory device includes a fixed base, a control unit, a rotatable base, a driving device and a multi-sensory module having at least one selecting from the group consisting of a wind module, a hot air module, a heat module, and a liquid mist module. The head-mounted multi-sensory device includes a helmet, a display screen, earphones, a positioning module and an air flow guiding module. The present invention truly simulates image, sound effect, air flow, humidity, temperature, and smell of a specific environment, to stimulate the senses of sight, hearing, smell, and touch etc. of the user, thereby allowing the user to have an immersive experience in the simulated environment and avoiding increasing physical burden on the user's body.

9 Claims, 18 Drawing Sheets

(56) References Cited

U.S. PATENT DOCUMENTS

| | | | |
|---|---|---|---|
| 10,345,768 B2* | 7/2019 | Fullam | G05B 15/02 |
| 2009/0187389 A1* | 7/2009 | Dobbins | G06F 3/011 |
| | | | 703/6 |
| 2014/0266717 A1* | 9/2014 | Warren | G06Q 30/016 |
| | | | 340/540 |
| 2015/0177596 A1* | 6/2015 | Bergsten | F16M 13/022 |
| | | | 248/205.1 |
| 2017/0301140 A1* | 10/2017 | Smith | G06T 19/006 |
| 2018/0164594 A1* | 6/2018 | Lee | G02B 27/0176 |
| 2018/0190022 A1* | 7/2018 | Zamir | G06T 19/006 |
| 2019/0143223 A1* | 5/2019 | Tamiya | A63F 13/52 |
| | | | 463/31 |

* cited by examiner

OVERHANG ROTATABLE MULTI-SENSORY DEVICE AND A VIRTUAL REALITY MULTI-SENSORY SYSTEM COMPRISING THE SAME

CROSS-REFERENCE TO RELATED APPLICATION

This application claims the priority of U.S. provisional application No. 62/647,641 filed on Mar. 24, 2018, which is incorporated herewith by reference.

BACKGROUND OF THE INVENTION

1. Field of the Invention

The present invention relates generally to a virtual reality device, and more particularly, to an overhang rotatable multi-sensory device which rotates with the user and simulates air flow, humidity, temperature and smell of a specific environment, and a virtual reality multi-sensory system comprising the same.

2. The Prior Arts

As technology advanced, a head-mounted display (HMD) for displaying images has been developed. Combining with earphones, the head-mounted display may simulate images and sounds of a virtual environment, allowing a user to experience images and sounds of the virtual environment in a real environment.

However, human is not only capable of seeing images of environment by sense of sight and hearing sounds of environment by sense of hearing, but also capable of smelling odor or scent of environment by sense of smell and feeling temperature, humidity and air flow etc. of environment by sense of touch. A combination of the head-mounted display and the earphones merely simulates images and sounds of environment, but does not provide smell, temperature, humidity, and air flow of environment, reducing the effects perceived from virtual reality such as state of presence and immersive experience.

In order to solve the above-mentioned problem, some users place devices such as a smell generating device, a heat source and a fan etc. at a fixed position. The smell generating device includes a liquid tank and a sprinkler; the liquid tank contains liquid such as clean water or essential oil and the sprinkler sprays the liquid such as clean water or essential oil out, to simulate smell and humidity of a specific environment. The heat source may change temperature of environment. The fan may provide winds with varied volumes. Thus, the smell generating device, the heat source, and the fan etc. may simulate smell, temperature, humidity, and air flow of environment.

Yet, as the user moves, the relative position and direction of the user with respect to the smell generating device, the heat source, and the fan etc. is changed. The user's perception to the smell, temperature, humidity and air flow supplied by the devices will change in accordance to different locations and directions. In particular, when the user faces away from the smell generating device, it is difficult for the user to perceive the smell of environment, which reduces the stimulation effects of a specific environment.

The defects mentioned above can be improved by disposing multiple smell generating devices, heat sources, and fans etc. at multiple locations. However, in this way, the manufacture cost is greatly increased and becomes burdensome to the user.

Some industrial manufacturers have attempted to integrate the smell generating device, the heat source, the fan, the head-mounted display and the earphones into one virtual reality multi-sensory system to solve the mentioned problems. However, the weight of such virtual reality multi-sensory system is heavy and increases the user's loading burden on the neck. The loading burden on the neck is particularly heavy when the smell generating device includes a liquid tank.

Another solution thereof is to wear the smell generating device, the heat source, and the fan etc. on the user. The loading burden on the neck is decreased by this way, but the burden on the body is increased.

SUMMARY OF THE INVENTION

A primary objective of the present invention is to provide an overhang rotatable multi-sensory device which may be mounted on the top of the head of the user to be rotatable with user's movement and supplies a single or multiple feedbacks such as wind, hot air, radiation, liquid spraying, mist vapor, cold air and olfactory feedbacks etc., thereby achieving the simulation effects such as air flow, humidity, temperature and smell of the specific environment.

Another primary objective of the present invention is to provide a virtual reality multi-sensory system which simulates image, sound effect, air flow, humidity, temperature and smell of the specific environments, to stimulate the senses of sight, hearing, smell, and touch of the user, thereby allowing the user to have an immersive experience in the simulated environment and avoiding increasing physical burden on the user's body.

In order to achieve the foregoing objectives, the present invention provides an overhang rotatable multi-sensory device comprising a fixed base, a control unit, a rotatable base, a driving device and a multi-sensory module. The rotatable base is rotatably disposed on the fixed base. The control unit is disposed within the rotatable base or the fixed base. The driving device is disposed between the fixed base and the rotatable base, and electrically connected with the control unit. The control unit controls the driving device to drive the rotatable base to rotate with respect to the fixed base. The multi-sensory module includes at least one selecting from the group consisting of a wind module, a hot air module, a heat module, and a liquid mist module. The wind module is disposed on the rotatable base, and electrically connected with the control unit. The control unit controls the wind module to generate winds with varied volumes. The hot air module is disposed on the rotatable base, and electrically connected with the control unit. The control unit controls the hot air module to generate winds with varied volumes and varied temperatures. The heat module is disposed on the rotatable base, and electrically connected with the control unit. The control unit controls the heat module to generate radiation with varied temperatures. The liquid mist module is disposed on the rotatable base, and electrically connected with the control unit. The control unit controls the liquid mist module to spray liquid with varied amounts and/or mist with varied drop sizes.

Preferably, the rotatable base is provided with a plurality of installing recesses at its external side, the installing recesses are spaced apart from each other; and the wind module, the hot air module, the heat module and the liquid mist module are individually disposed in the installing recesses.

Preferably, the wind module includes a fan base and a fan; the fan base is disposed in one of the installing recesses; the fan of the wind module is pivotally disposed on the fan base, rotatable up and down with respect to the fan base, and electrically connected with the control unit, and the fan of the wind module includes a plurality of blades; and the control unit controls rotation angle of the fan and rotation speed of the blades of the wind module, to generate winds with varied angles and volumes.

Preferably, the hot air module includes a hot air base, a fan and a heater; the hot air base is disposed in one of the installing recesses; the fan of the hot air module is pivotally disposed on the hot air base, rotatable up and down with respect to the hot air base, and electrically connected with the control unit, and the fan of the hot air module includes a plurality of blades; the heater is disposed at an outlet of the fan of the hot air module and electrically connected with the control unit; and the control unit controls rotation angle of the fan and rotation speed of the blades of the hot air module and heating temperature of the heater, to generate winds with varied angles, volumes and temperatures.

Preferably, the heat module includes a heating base and a heat source; the heating base is disposed in one of the installing recesses; the heat source is pivotally disposed on the heating base, rotatable up and down with respect to the heating base, and electrically connected with the control unit; and the control unit controls rotation angle and temperature of the heat source, to generate radiation with varied angles and temperatures.

Preferably, the liquid mist module includes a liquid tank, a sprinkler and an atomizer; the liquid tank contains liquid; the sprinkler and the atomizer are individually connected to the liquid tank and electrically connected with the control unit; and the control unit controls the sprinkler to apply pressure on the liquid in the liquid tank and spray the liquid with varied amounts outward, and the control unit controls the atomizer to atomize the liquid in the liquid tank and spray mist with varied drop sizes outward.

Preferably, the sprinkler and the atomizer are each provided with a liquid outlet opening downward; the liquid mist module further includes a plurality of mist guiding blades pivotally disposed at the liquid outlet of the atomizer, rotatable with respect to the atomizer in the directions toward and away from a central axis of the rotatable base, and electrically connected with the control unit; and the control unit controls rotation angle of the mist guiding blades, to guide a flowing direction of the mist.

Preferably, the fixed base includes a hanging portion and a base portion; the hanging portion has a plurality of support legs at its bottom, bottom ends of the support legs are secured on top of the base portion; the rotatable base is disposed to surround an external side of the base portion of the fixed base and has a ring gear on a top end thereof; the driving device includes a motor, a speed reducer, a drive shaft, and a planetary gear set; the motor is disposed on the base portion and electrically connected with the control unit; the speed reducer is disposed on the base portion and combined to an output shaft of the motor; the planetary gear set includes a sun gear and a planet gear; the drive shaft is combined with the speed reducer and penetrates through a central axis of the sun gear; the planet gear is engaged with the sun gear and the ring gear; the control unit controls the output shaft of the motor to rotate and transmit dynamic power to the drive shaft after the output shaft of the motor is decelerated by the speed reducer; and the drive shaft drives the sun gear to rotate, the sun gear drives the planet gear to rotate, and then the planet gear drives the rotatable base to rotate via the ring gear.

In order to achieve the foregoing objectives, the present invention provides a virtual reality multi-sensory system comprising the overhang rotatable multi-sensory device and a head-mounted multi-sensory device. The head-mounted multi-sensory device includes a helmet, a display screen, two earphones, and a positioning module. The display screen is disposed at a front side of the helmet to display a scene image of a specific environment selected by an user. The two earphones are each disposed at a lateral side of the helmet to play a scene sound effect of the specific environment selected by the user. The positioning module is disposed within the helmet and connected with the control unit of the overhang rotatable multi-sensory device via wireless communication protocol, to locate a real-time coordinate of a position of the user and transfer the real-time coordinate to the control unit of the overhang rotatable multi-sensory device; wherein, by utilizing the real-time coordinate, the control unit of the overhang rotatable multi-sensory device controls the driving device to drive the rotatable base to rotate with respect to the fixed base, such that at least one of the wind module, the hot air module, the heat module and the liquid mist module is continuously operated facing the user.

Preferably, the head-mounted multi-sensory device further includes an air flow guiding module, the air flow guiding module includes an air purifier and two flow guiding fans; the air purifier is disposed in the middle of the front side at a bottom of the helmet; the two flow guiding fans are disposed at the bottom of the front side of the helmet and each is located at a lateral side of the air purifier; the two flow guiding fans guide liquid vapor and/or mist vapor mixed by the liquid and/or the mist sprayed from the liquid mist module and an external air to a nose of the user, thereby generating an olfactory feedback; after the overhang rotatable multi-sensory device, the display screen and the two earphones complete simulating the specific environment, the two flow guiding fans guide the external air through the air purifier for purifying, to remove a smell simulated in a space and provide clean air to the nose of the user, thereby preventing the smell of an previous space from remaining and mixing with that of a new space.

The present invention is advantageously adapted in that the positioning module of the head-mounted multi-sensory device tracks the real-time coordinate of the user, thereby allowing the overhang rotatable multi-sensory device to rotate with the user's movement. Accordingly, the wind module, the hot air module, the heat module and the liquid mist module will follow and face to the user, providing one or more of wind, hot air, heat radiation, liquid spraying, mist vapor, cold air and olfactory feedbacks. The head-mounted multi-sensory device provides visual and auditory feedbacks. Thus, the virtual reality multi-sensory system of the present invention truly simulates image, sound effect, air flow, humidity, temperature, and smell of specific environments, to stimulate the senses of sight, hearing, smell, and touch etc. of the user, thereby allowing the user to have an immersive experience in the simulated environment and avoiding increasing physical burden on the user's body.

BRIEF DESCRIPTION OF THE DRAWINGS

The present invention will be apparent to those skilled in the art by reading the following detailed description of a preferred embodiment thereof, with reference to the attached drawings, in which.

DETAILED DESCRIPTION OF THE PREFERRED EMBODIMENT

The accompanying drawings are included to provide a further understanding of the invention, and are incorporated in and constitute a part of this specification. The drawings illustrate embodiments of the invention and, together with the description, serve to explain the principles of the invention.

Figure 1:
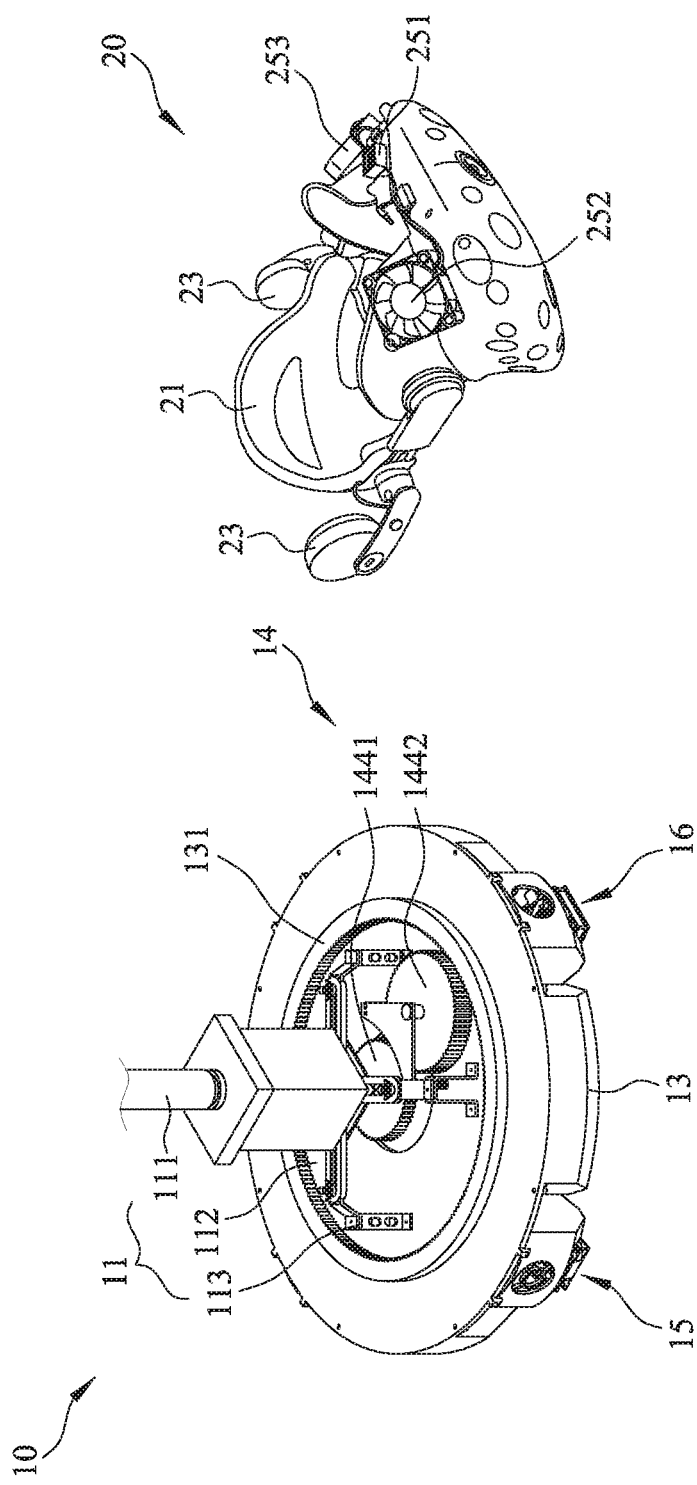
FIG. 1 is a prospective view of the virtual reality multi-sensory system of the present invention.
Figure 2:
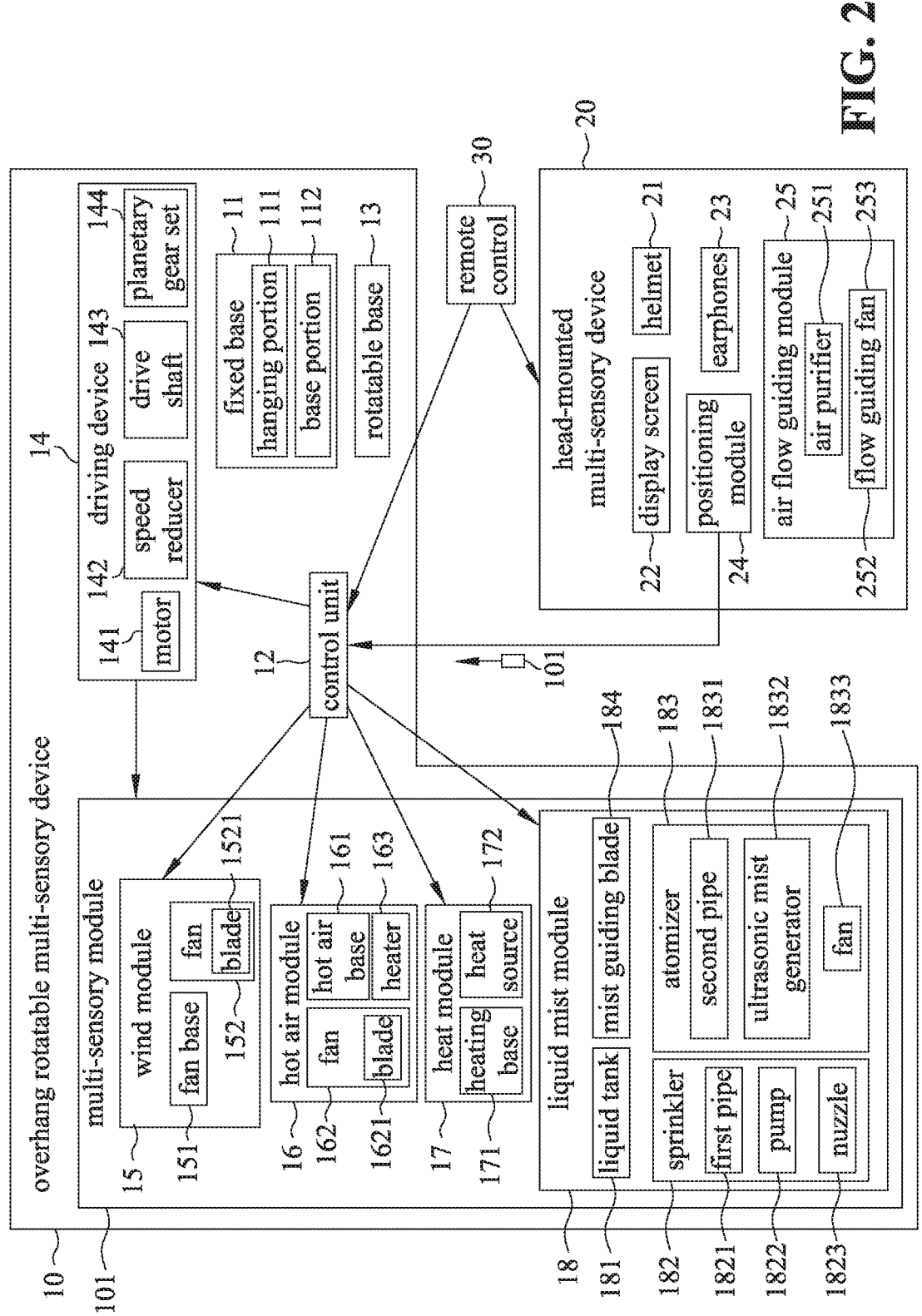
FIG. 2 is a block diagram of the virtual reality multi-sensory system of the present invention.

Referring to FIGS. 1 and 2, which are respectively a prospective view and a block diagram of the virtual reality multi-sensory system of the present invention. The present invention provides a virtual reality multi-sensory system including an overhang rotatable multi-sensory device 10 and a head-mounted multi-sensory device 20.

Figure 3:
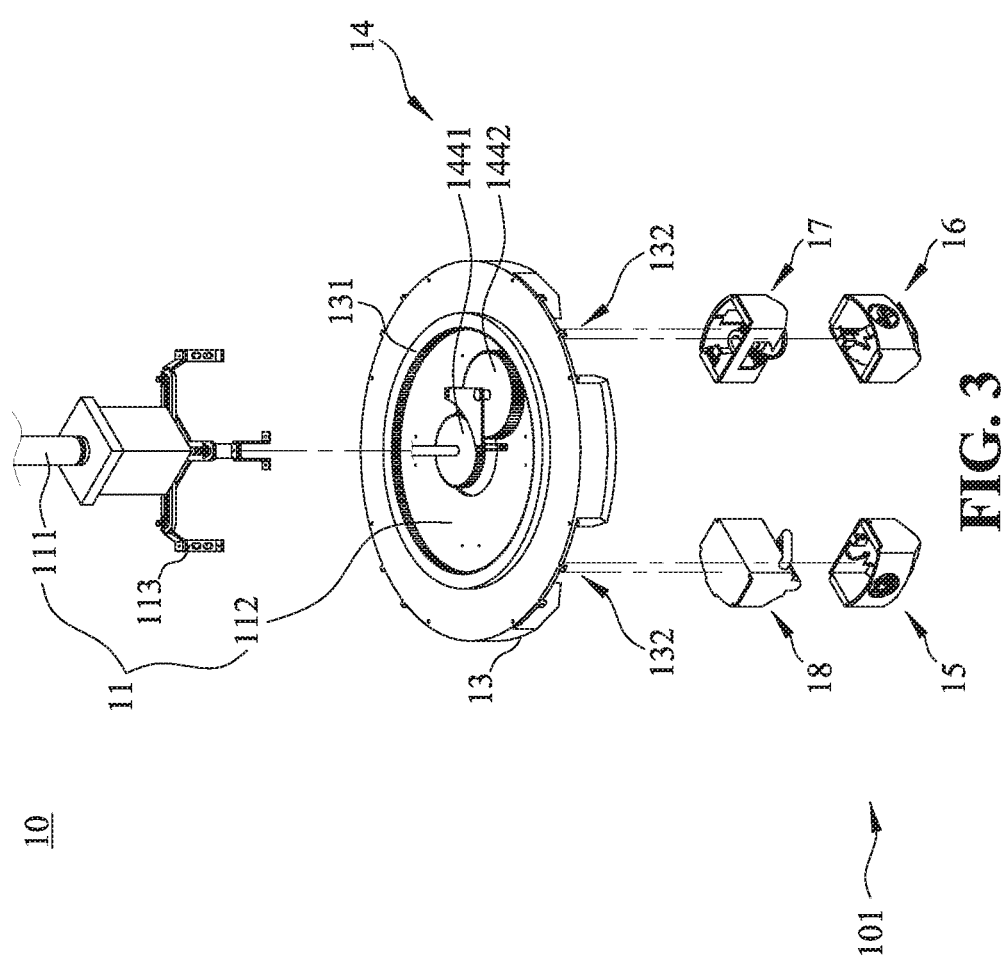
FIG. 3 is an exploded view of the overhang rotatable multi-sensory device of the present invention.

Referring to FIG. 3, which is an exploded view of the overhang rotatable multi-sensory device 10 of the present invention, along with FIGS. 1 and 2, the overhang rotatable multi-sensory device 10 comprises a fixed base 11, a control unit 12, a rotatable base 13, a driving device 14 and a multi-sensory module 101.

The rotatable base 13 is rotatably disposed on the fixed base 11. The control unit 12 is disposed within the rotatable base 13 or the fixed base 11. The driving device 14 is disposed between the fixed base 11 and the rotatable base 13, and electrically connected with the control unit 12. The control unit 12 controls the driving device 14 to drive the rotatable base 13 to rotate with respect to the fixed base 11. More specifically, the fixed base 11 includes a hanging portion 111 and a base portion 112. The hanging portion 111 is configured to be disposed on a ceiling, underneath a roof or a beam, or any indoor place above a user's head. The hanging portion 111 has a plurality of support legs 113 at its bottom, bottom ends of the support legs 113 are secured on top of the base portion 112. The base portion 112 is disposed with a collector ring (not shown) therein. The rotatable base 13 is disposed to surround an external side of the base portion 112 of the fixed base 11, electrically connected with the collector ring, and has a ring gear 131 on a top end thereof. The collector ring supplies power required by the rotatable base 13. The driving device 14 includes a motor 141, a speed reducer 142, a drive shaft 143, and a planetary gear set 144. The motor 141 is disposed on the base portion 112 and electrically connected with the control unit 12, the speed reducer 142 is disposed on the base portion 112, and an output shaft (not shown) of the motor 141 is combined to the speed reducer 142. The planetary gear set 144 includes a sun gear 1441 and a planet gear 1442, the drive shaft 143 is combined with the speed reducer 142 and penetrates through a central axis of the sun gear 1441, and the planet gear 1442 is engaged with the sun gear 1441 and the ring gear 131. The control unit 12 controls the output shaft of the motor 141 to rotate and transmit dynamic power to the drive shaft 143 after the output shaft of the motor 141 is decelerated by the speed reducer 142; the drive shaft 143 drives the sun gear 1441 to rotate, and the sun gear 1441 drives the planet gear 1442 to rotate, then the planet gear 1442 drives the rotatable base 13 to rotate via the ring gear 131.

The multi-sensory module 101 includes a wind module 15, a hot air module 16, a heat module 17 and a liquid mist module 18. The wind module 15, the hot air module 16, the heat module 17 and the liquid mist module 18 are disposed on the rotatable base 13 and each is electrically connected with the control unit 12. The control unit 12 controls the wind module 15 to generate winds with varied volumes, the hot air module 16 to generate winds with varied volumes and varied temperatures, the heat module 17 to generate radiation with varied temperatures, and the liquid mist module 18 to spray liquid with varied amounts and/or mist with varied drop sizes. More specifically, the rotatable base 13 is disposed with a plurality of installing recesses 132 at its external side, the installing recesses 132 are spaced apart from each other, and the wind module 15, the hot air module 16, the heat module 17 and the liquid mist module 18 are individually disposed in the plurality of installing recesses 132. In a preferred embodiment, the installing recesses 132 are disposed at different positions of the external side of the rotatable base 13, allowing the wind module 15, the hot air module 16, the heat module 17 and the liquid mist module 18 to face toward different directions. The wind module 15, the hot air module 16, the heat module 17 and the liquid mist module 18 may be disposed in any installing recesses 132 as user desired. In other embodiments, the number of the wind module 15, the hot air module 16, the heat module 17, the liquid mist module 18 and the installing recesses 132 may be increased to form various combinations.

Figure 4:
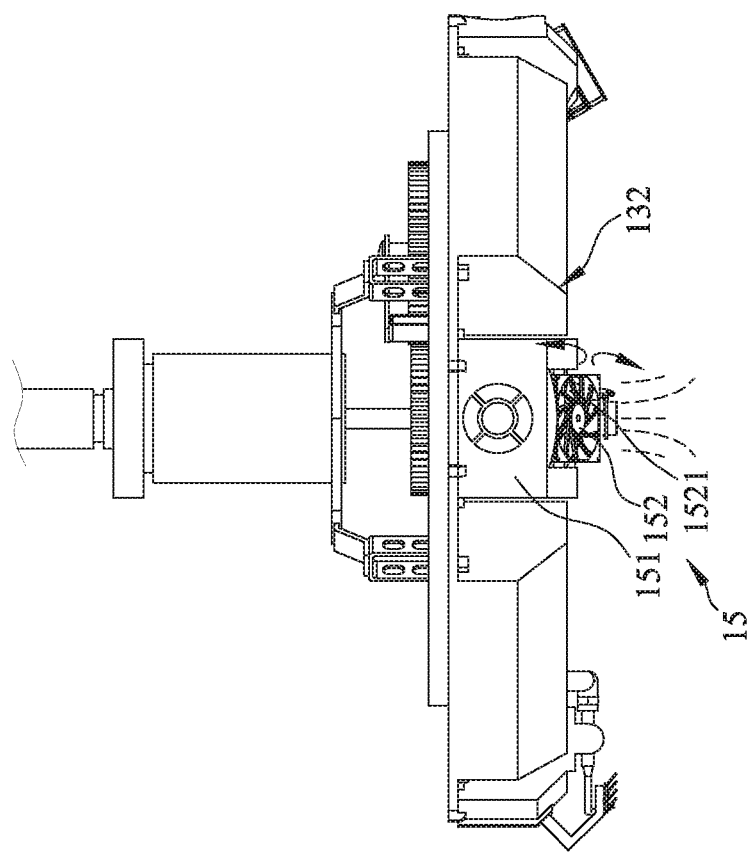
FIG. 4 is a schematic diagram illustrating the wind module of the overhang rotatable multi-sensory device of the present invention generating winds.

Referring to FIG. 4, which is a schematic diagram illustrating the wind module 15 of the overhang rotatable multi-sensory device 10 of the present invention generating winds, and FIG. 2, the wind module 15 includes a fan base 151 and a fan 152. The fan base 151 is disposed in one of the installing recesses 132. The fan 152 of the wind module 15 is pivotally disposed on the fan base 151, rotatable up and down with respect to the fan base 151, and electrically connected with the control unit 12. The fan 152 of the wind module 15 includes a plurality of blades 1521. The control unit 12 controls rotation angle of the fan 152 and rotation speed of the blades 1521 of the wind module 15, to generate winds with varied angles and volumes, thereby providing wind feedbacks within a wide range of area.

Figure 5:
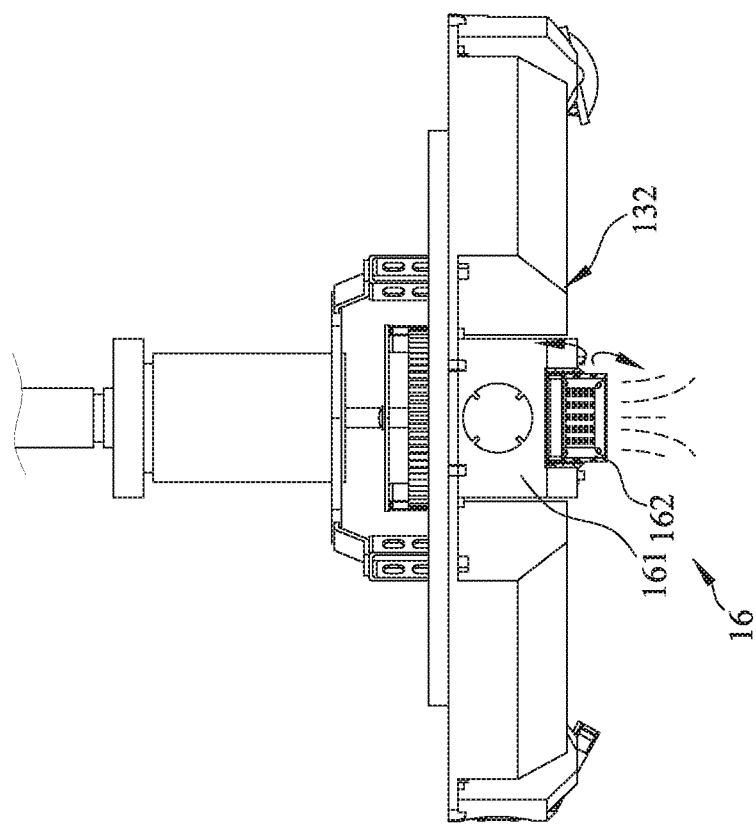
FIG. 5 is a schematic diagram illustrating the hot air module of the overhang rotatable multi-sensory device of the present invention generating hot air.

Referring to FIG. 5, which is a schematic diagram illustrating the hot air module 16 of the overhang rotatable multi-sensory device 10 of the present invention generating hot air, and FIG. 2, the hot air module 16 includes a hot air base 161, a fan 162 and a heater 163. The hot air base 161 is disposed in one of the installing recesses 132. The fan 162 of the hot air module 16 is pivotally disposed on the hot air base 161, rotatable up and down with respect to the hot air base 161, and electrically connected with the control unit 12. The fan 162 of the hot air module 16 includes a plurality of blades 1621. The heater 163 is disposed at an outlet of the fan 162 of the hot air module 16 and electrically connected with the control unit 12. The control unit 12 controls rotation angle of the fan 162 and rotation speed of the blades 1621 of the hot air module 16 and heating temperature of the heater 163, to generate winds with varied angles, volumes and temperatures, thereby increasing the temperature within the affected area and providing hot air feedbacks within a wide range of area. The heater 163 may be an electric heating tube or an electric heating plate.

Figure 6:
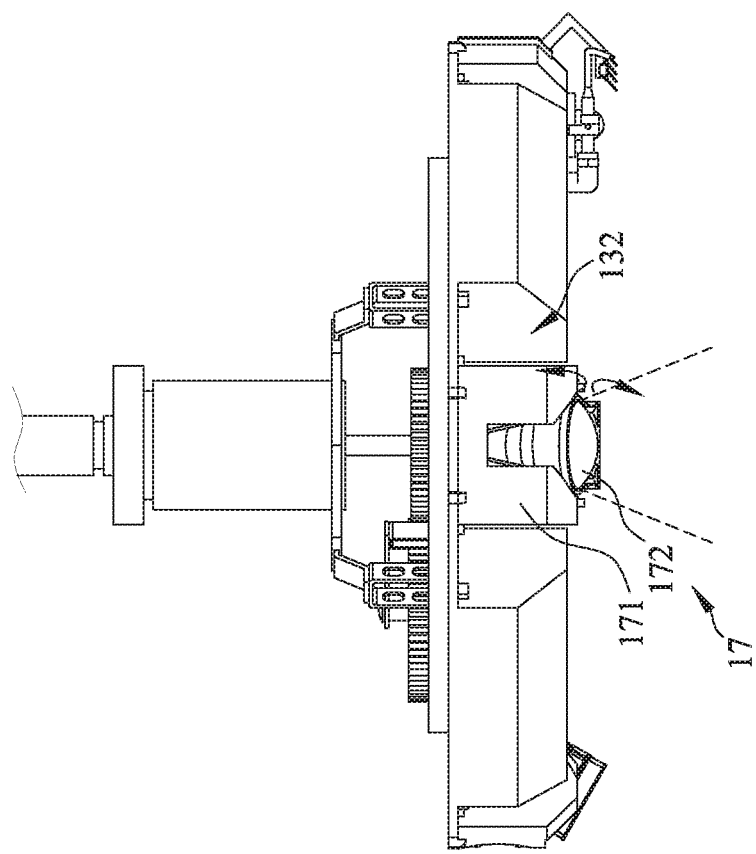
FIG. 6 is a schematic diagram illustrating the heat module of the overhang rotatable multi-sensory device of the present invention generating radiation.

Referring to FIG. 6, which is a schematic diagram illustrating the heat module 17 of the overhang rotatable multi-sensory device 10 of the present invention generating radiation, and FIG. 2, the heat module 17 includes a heating base 171 and a heat source 172. The heating base 171 is disposed in one of the installing recesses 132. The heat source 172 is pivotally disposed on the heating base 171, rotatable up and down with respect to the heating base 171, and electrically connected with the control unit 12. The control unit 12 controls rotation angle and temperature of the heat source 172, to generate radiation with varied angles and temperatures, thereby increasing the temperature within the affected area and providing heat radiation feedbacks within a wide range of area. In the present embodiment, the heat source 172 is an infrared light, and the radiation is an infrared ray.

Figure 7:
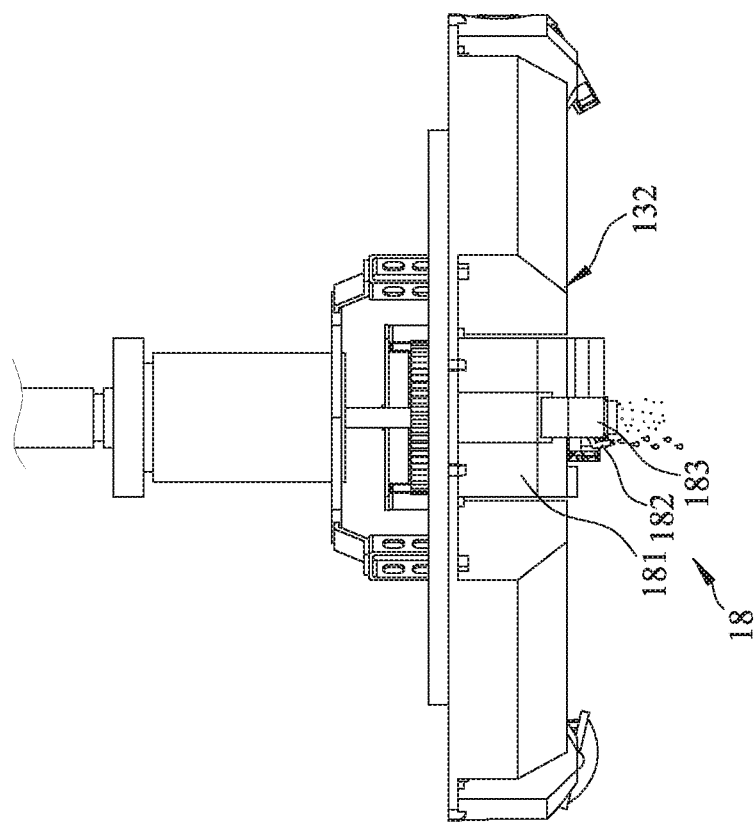
FIG. 7 is a schematic diagram illustrating the liquid mist module of the overhang rotatable multi-sensory device of the present invention spraying liquid and mist.
Figure 8:
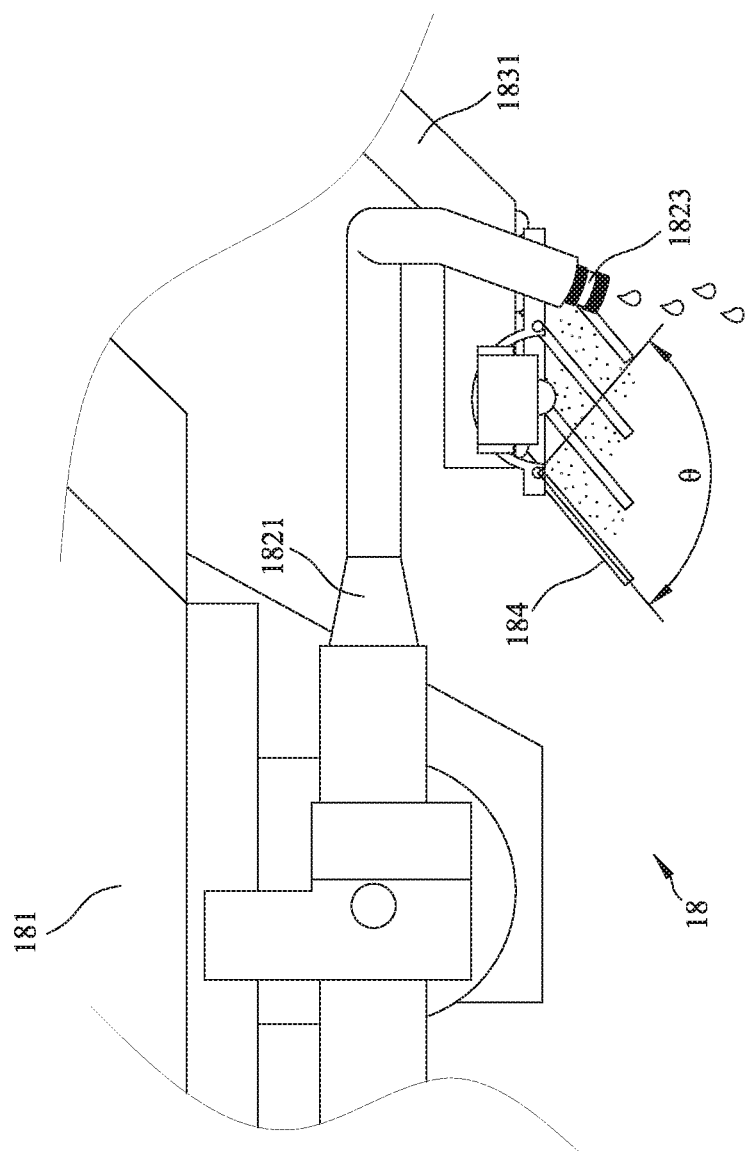
FIG. 8 is an enlarged schematic diagram illustrating the liquid mist module of the overhang rotatable multi-sensory device of the present invention spraying liquid and mist.

Referring to FIGS. 7 and 8, which are respectively a schematic diagram and an enlarged schematic diagram illustrating the liquid mist module 18 of the overhang rotatable multi-sensory device 10 of the present invention spraying liquid and mist, and FIGS. 2, 5, and 6, the liquid mist module 18 includes a liquid tank 181, a sprinkler 182 and an atomizer 183. The liquid tank 181 contains liquid; the liquid may be those without an odor or scent such as clean water or those with a scent such as essential oils. The sprinkler 182 and the atomizer 183 are individually connected to the liquid tank 181 and electrically connected with the control unit 12. The control unit 12 controls the sprinkler 182 to apply pressure on the liquid in the liquid tank 181 and spray the liquid with varied amounts outward, thereby providing liquid spraying feedbacks allowing the temperature of the affected area to be reduced and providing olfactory feedbacks. The control unit 12 controls the atomizer 183 to atomize the liquid in the liquid tank 181 and spray mist with varied drop sizes outward, thereby providing mist spraying feedbacks allowing the temperature of the affected area to be reduced and providing olfactory feedbacks.

As shown in FIG. 8, in the preferred embodiment, the sprinkler 182 is provided with a liquid outlet opening downward, and the atomizer 183 is provided with a liquid outlet opening downward. The liquid mist module 18 further includes a plurality of mist guiding blades 184; the mist guiding blades 184 are pivotally disposed at the liquid outlet of the atomizer 183, rotatable with respect to the atomizer 183 in the directions toward and away from a central axis of the rotatable base 13, and electrically connected with the control unit 12. The control unit 12 controls rotation angle θ of the mist guiding blades 184 to guide a flowing direction of the mist. In the present embodiment, the rotation angle θ of the mist guiding blades 184 is between 100° to 150°, but not limited hereto; the user may adjust rotation angle θ of the mist guiding blades 184 according to the dimension of the space and the height of the ceiling.

In the present embodiment, the sprinkler 182 includes a first pipe 1821, a pump 1822 and a nozzle 1823; and the atomizer 183 includes a second pipe 1831, a plurality of ultrasonic mist generators 1832 and a fan 1833. The first pipe 1821 is connected with the liquid tank 181, the pump 1822 is disposed on the first pipe 1821 and electrically connected with the control unit 12, and the nozzle 1823 is disposed at an end of the first pipe 1821. The second pipe 1831 is connected with the liquid tank 181, the ultrasonic mist generators 1832 are disposed in the liquid tank 181 and electrically connected with the control unit 12, and the fan 1833 is disposed on top of the liquid tank 181 and electrically connected with the control unit 12. The control unit 12 controls the pump 1822 to introduce the liquid into the first pipe 1821 such that the liquid is sprayed from the nozzle 1823 to external environment. The control unit 12 controls the ultrasonic mist generators 1832 to atomize the liquid in the liquid tank 181 by ultrasonic vibration, and the fan 1833 of the atomizer 183 blows the mist in the second pipe 1831 from its liquid outlet to external environment.

It is important to note that, a combination of the wind module 15 and the liquid mist module 18 is capable to provide cold air feedbacks with varied volumes and allows the temperature of the affected area to be rapidly decreased.

Figure 9:
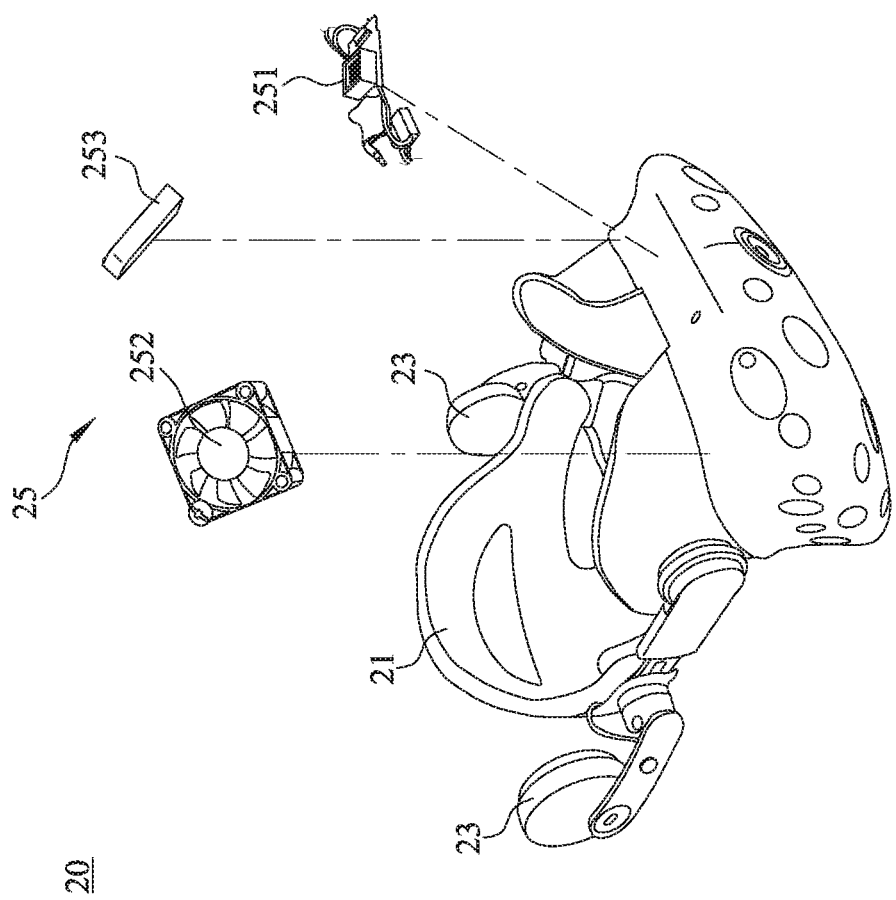
FIG. 9 is an exploded view of the head-mounted multi-sensory device of the present invention.

Referring to FIG. 9, which is an exploded view of the head-mounted multi-sensory device 20 of the present invention, and FIGS. 1 and 2, the head-mounted multi-sensory device 20 includes a helmet 21, a display screen 22, two earphones 23, a positioning module 24 and an air flow guiding module 25. The helmet 21 is configured to be worn on the user's head. The display screen 22 is disposed at a front side of the helmet 21 to display a scene image of a specific environment selected by the user. The two earphones 23 are each disposed at a lateral side of the helmet 21 to play a scene sound effect of the specific environment selected by the user. The helmet 21, the display screen 22 and the earphones 23 are basic equipment of the head-mounted multi-sensory device 20, which belong to prior art. The positioning module 24 is disposed within the helmet 21, and connected with the control unit 12 of the overhang rotatable multi-sensory device 10 via wireless communication protocol to locate a real-time coordinate 101 of a position of the user and transfer the real-time coordinate 101 to the control unit 12 of the overhang rotatable multi-sensory device 10. By utilizing the real-time coordinate, the control unit 12 of the overhang rotatable multi-sensory device 10 controls the driving device 14 to drive the rotatable base 13 to rotate with respect to the fixed base 11, such that at least one of the wind module 15, the hot air module 16, the heat module 17 and the liquid mist module 18 is continuously operated facing the user. Technical features thereof will be described in detail in the following paragraphs. The air flow guiding module 25 includes an air purifier 251 and two flow guiding fans 252, 253. The air purifier 251 is disposed in the middle of the front side at a bottom of the helmet 21, exactly below the nose holes of the user. The two flow guiding fans 252, 253 are disposed at the bottom of the front side of helmet 21 and each is located at a lateral side of the air purifier 251, exactly below the eyes of the user.

Figure 10:
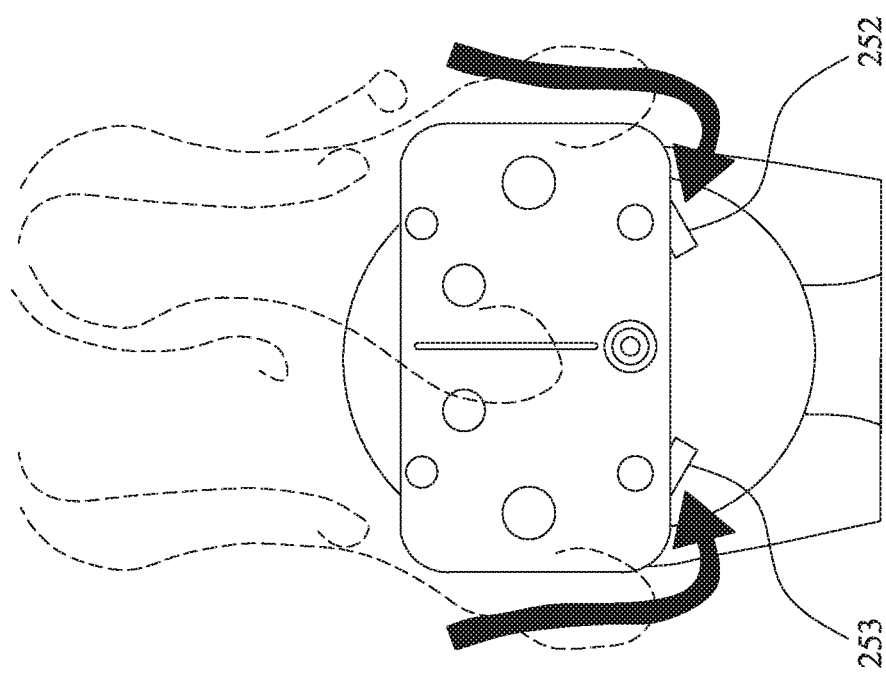
FIG. 10 is a schematic diagram illustrating the air flow guiding module of the head-mounted multi-sensory device of the present invention guiding liquid vapor and mist vapor.

Referring to FIG. 10, which is a schematic diagram illustrating the air flow guiding module 25 of the head-mounted multi-sensory device 20 of the present invention guiding liquid vapor and mist vapor, the two flow guiding fans 252, 253 guide liquid vapor and/or mist vapor mixed by the liquid and/or mist sprayed from the liquid mist module 18 and an external air to the nose of the user, thereby effectively enhancing the reception of smells to the user's nose and generating an olfactory feedback. After the overhang rotatable multi-sensory device 10, the display screen 22 and the two earphones 23 complete simulating the specific environment, the two flow guiding fans 252, 253 guide the external air through the air purifier 251 for purifying to remove smells simulated in a space and provide clean air to the nose of the user, thereby preventing the smell of the previous space from remaining and mixing with that of a new space. Preferably, the two flow guiding fans 252, 253 each has an air outlet facing the middle of the top of the helmet 21 and an air inlet facing the bottom of the helmet 21 at a lateral side. In other words, the two flow guiding fans 252, 253 are slightly tilted. As a result, the liquid vapor and/or the mist vapor is allowed to be introduced from the air inlets of the two flow guiding fans 252, 253, and blown to the nose of the user from the air outlets of the two flow guiding fans 252, 253, thereby improving the efficiency in guiding the liquid vapor and/or the mist vapor to the nose of the user, to enhance the reception effect of smells to noses.

In addition, the control unit 12 may connects with the driving device 14, the wind module 15, the hot air module 16, the heat module 17 and the liquid mist module 18 via a plurality of signal transmission lines (not shown); the control unit 12 is required to connect with the positioning module 24 via wireless communication protocol. The control unit 12 may also connect with the driving device 14, the wind module 15, the hot air module 16, the heat module 17 and the liquid mist module 18 via wireless communication protocol. The wireless communication protocol may be Bluetooth, ZigBee, infrared ray, Wi-Fi or ultra-wideband.

The drawings are incorporated hereafter to illustrate that the simulation of image, sound effect, air flow, humidity, temperature and smell from the specific environments of the present invention to stimulate the senses of sight, hearing, smell, and touch of the user, thereby allowing the user to have an immersive experience.

Figure 11:
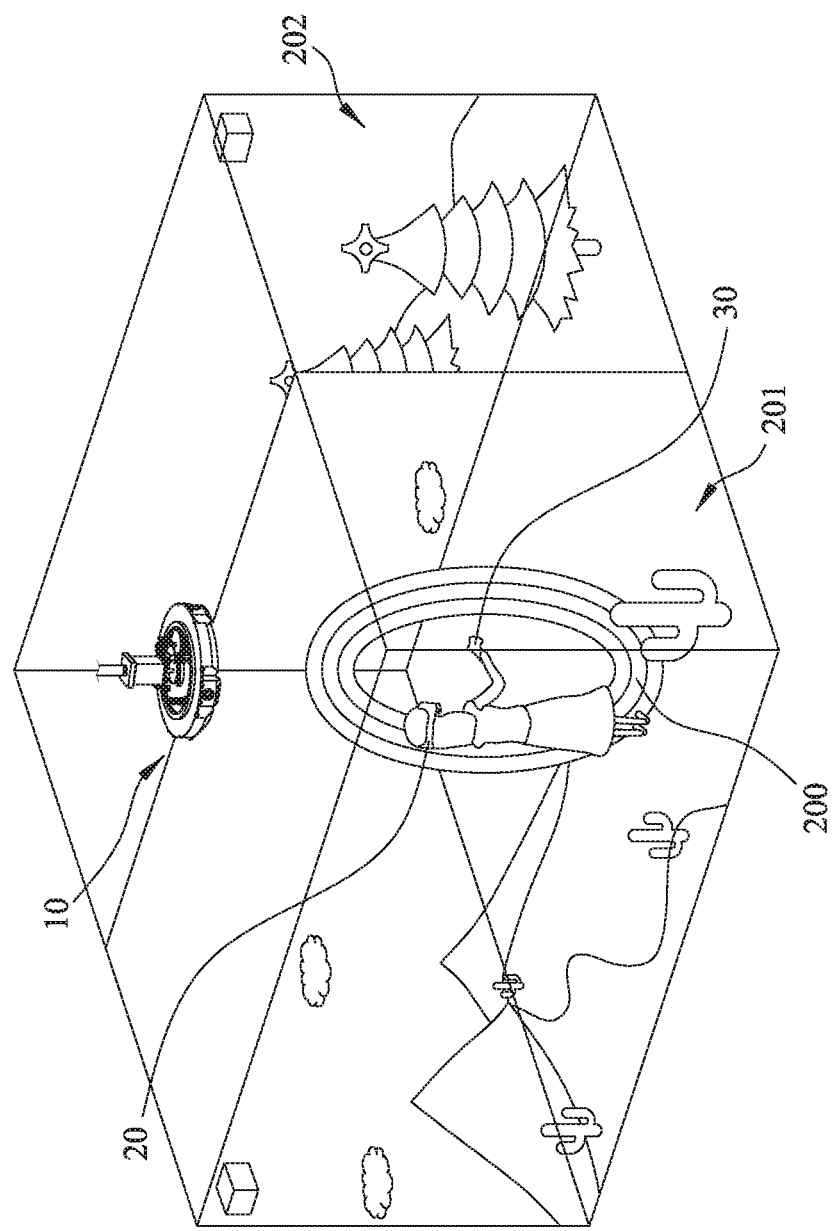
FIG. 11 is a schematic diagram illustrating the specific environment simulated by the virtual reality multi-sensory system of the present invention.
Figure 12:
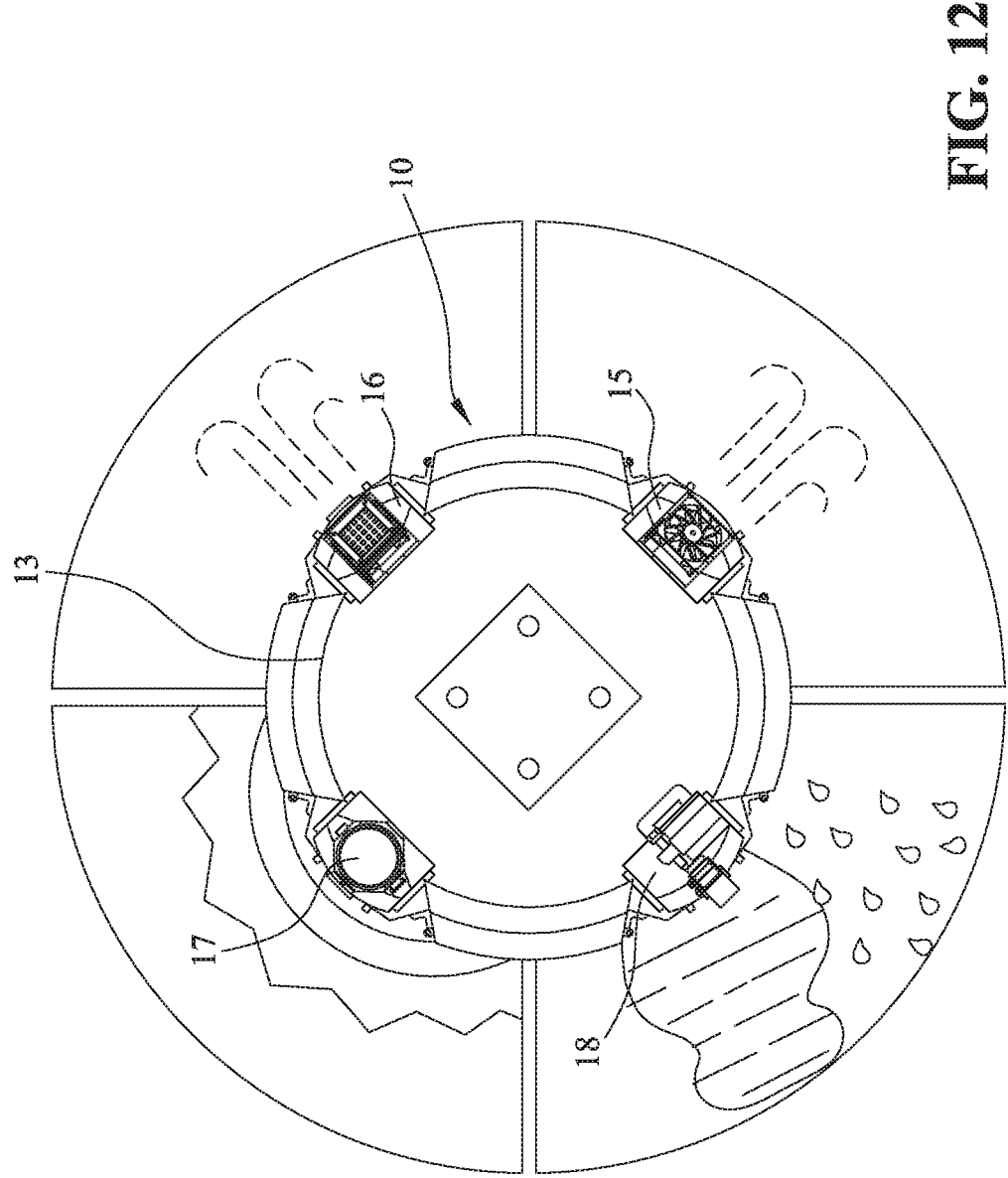
FIG. 12 is a schematic diagram illustrating the wind module, the hot air module, the heat module and the liquid mist module of the overhang rotatable multi-sensory device of the present invention operating at a same time.

Referring to FIGS. 11 and 12, which are a schematic diagram illustrating the specific environment simulated by the virtual reality multi-sensory system of the present invention and a schematic diagram illustrating the wind module 15, the hot air module 16, the heat module 17 and the liquid mist module 18 of the overhang rotatable multi-sensory device 10 of the present invention operating at a same time, respectively, and FIGS. 1 and 2, a remote control 30 is connected with the control unit 12, the display screen 22, the two earphones 23 and the air flow guiding module 25 via wireless communication protocol. The user may use the remote control 30 to switch for a specific environment. FIG. 11 shows that the user is located at a specific environment which is a desert 201, and a simulated anywhere door 200 appears in the picture of the display screen 22. Once the user passes the simulated anywhere door 200, the specific environment where the user locates is changed to a snow field 202.

First, the simulation of the environment of the desert 201 is illustrated. The display screen 22 displays a scene image of the desert 201, such that the eyes of the user (sense of sight) see an image of the desert 201. The two earphones 23 play a scene sound effect of the desert 201, such that the ears of the user (sense of hearing) hear a sound of the desert 201. The hot air module 16 generates high-temperature hot air and changes the volume of the air at all times, such that the skin of the user (sense of touch) feels the wind field of the desert 201. The heat module 17 generates high-temperature radiation, such that the skin of the user (sense of touch) feels radiation of the desert 201. The liquid mist module 18 generates liquid vapor or mist vapor with a smell of the desert 201, and the liquid vapor or the mist vapor may be evaporated by the hot air generated from the hot air module 16 and the high-temperature radiation generated from the heat module 17; thereby, a dried air with the smell of the desert 201 is simulated and guided by the air flow guiding module 25 to the nose of the user, such that the nose of the user (sense of smell) smells the odor or scent of the desert 201.

Then, the simulation of the environment of the snow field 202 is illustrated. The display screen 22 displays a scene image of the snow field 202, such that the eyes of the user (sense of sight) see an image of the snow field 202. The two earphones 23 plays a scene sound effect of the snow field 202, such that the ears of the user (sense of hearing) hear a sound of the snow field 202. The wind module 15 generates natural winds and changes the volume of the winds at all times, such that the skin of the user (sense of touch) feels the wind field of the snow field 202. The heat module 17 generates low-temperature radiation, such that the skin of the user (sense of touch) feels radiation of the snow field 202. The liquid mist module 18 generates liquid vapor or mist vapor with a smell of the snow field 202 which is guided by the air flow guiding module 25 to the nose of the user, such that the nose of the user (sense of smell) perceives the smell of the snow field 202. The combination of the wind module 15 and the liquid mist module 18 together supplies cold winds with varied amounts, such that the skin of the user (sense of touch) feels a biting cold wind of the snow field.

Figure 13:
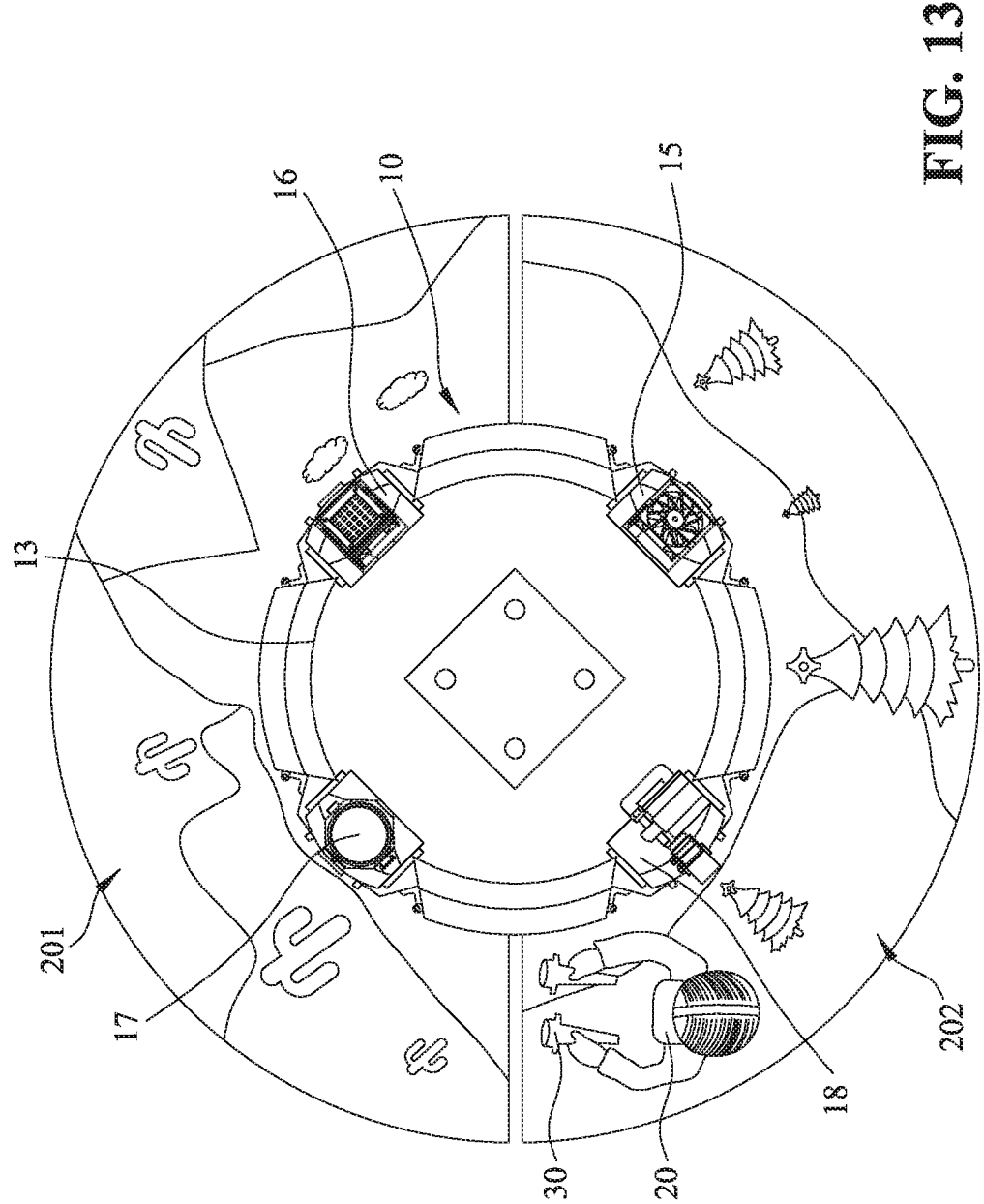
FIGS. 13 and 14 are schematic diagrams illustrating the rotation of the overhang rotatable multi-sensory device of the present invention changing with the coordinate of the user.
Figure 14:
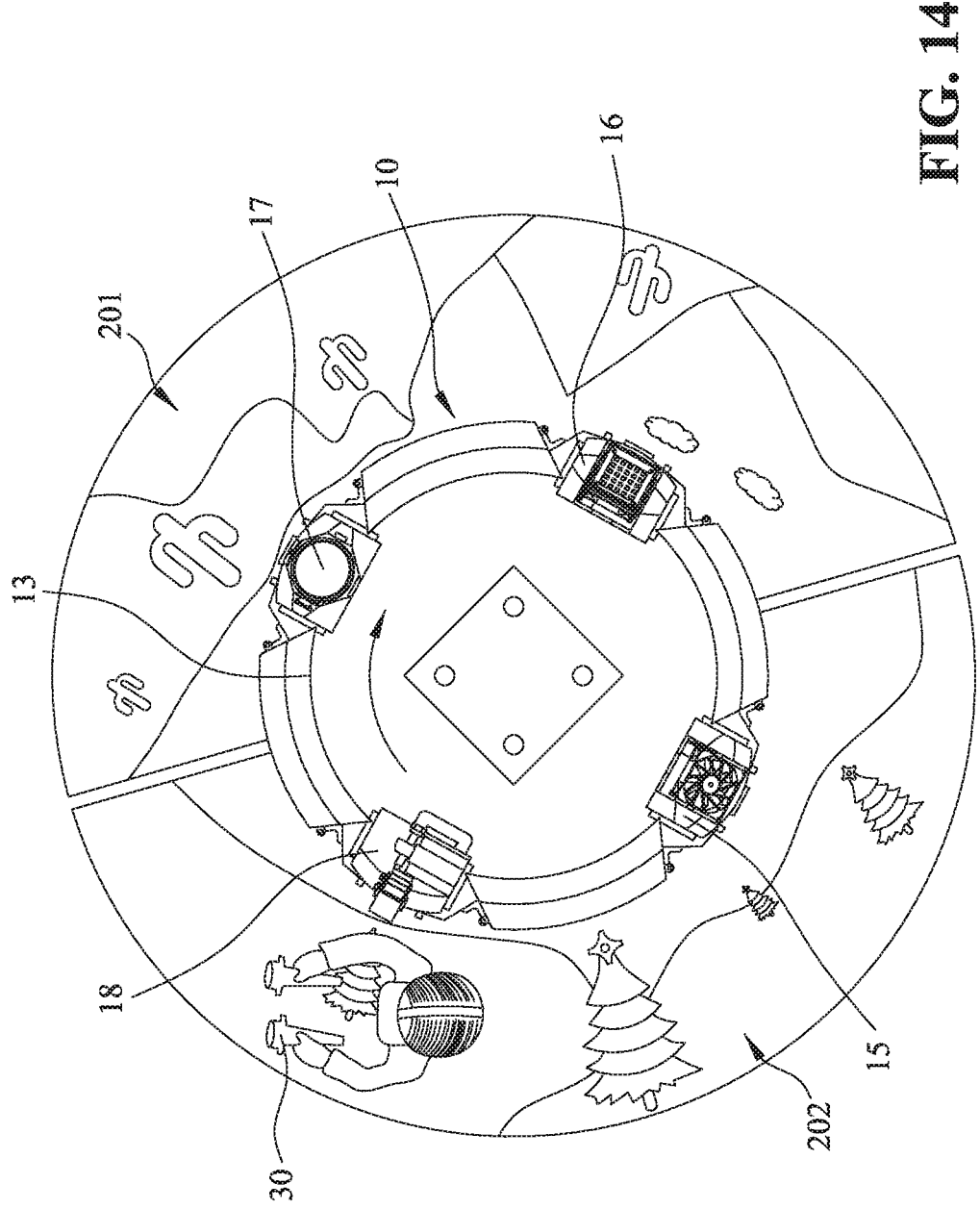

Referring to FIGS. 13 and 14, which are schematic diagrams illustrating the rotation of the overhang rotatable multi-sensory device of the present invention with changing coordinates of the user, and FIG. 2, the specific environment selected by the user is the snow field 202. As the user is moving, his real-time coordinate 101 continues to change, and the positioning module 24 of the head-mounted multi-sensory device 20 locates the real-time coordinate 101 of the position of the user and sends the real-time coordinate 101 to the control unit 12 of the overhang rotatable multi-sensory device 10. By utilizing the real-time coordinate 101, the control unit 12 of the overhang rotatable multi-sensory device 10 controls the driving device 14 to drive the rotatable base 13 to rotate with respect to the fixed base 11, such that the wind module 15 and the liquid mist module 18 continue to operate facing the user. The simulation of the snow field 202 is therefore maintained for the user to perceive as he is walking in the snow field 202.

Figure 15:
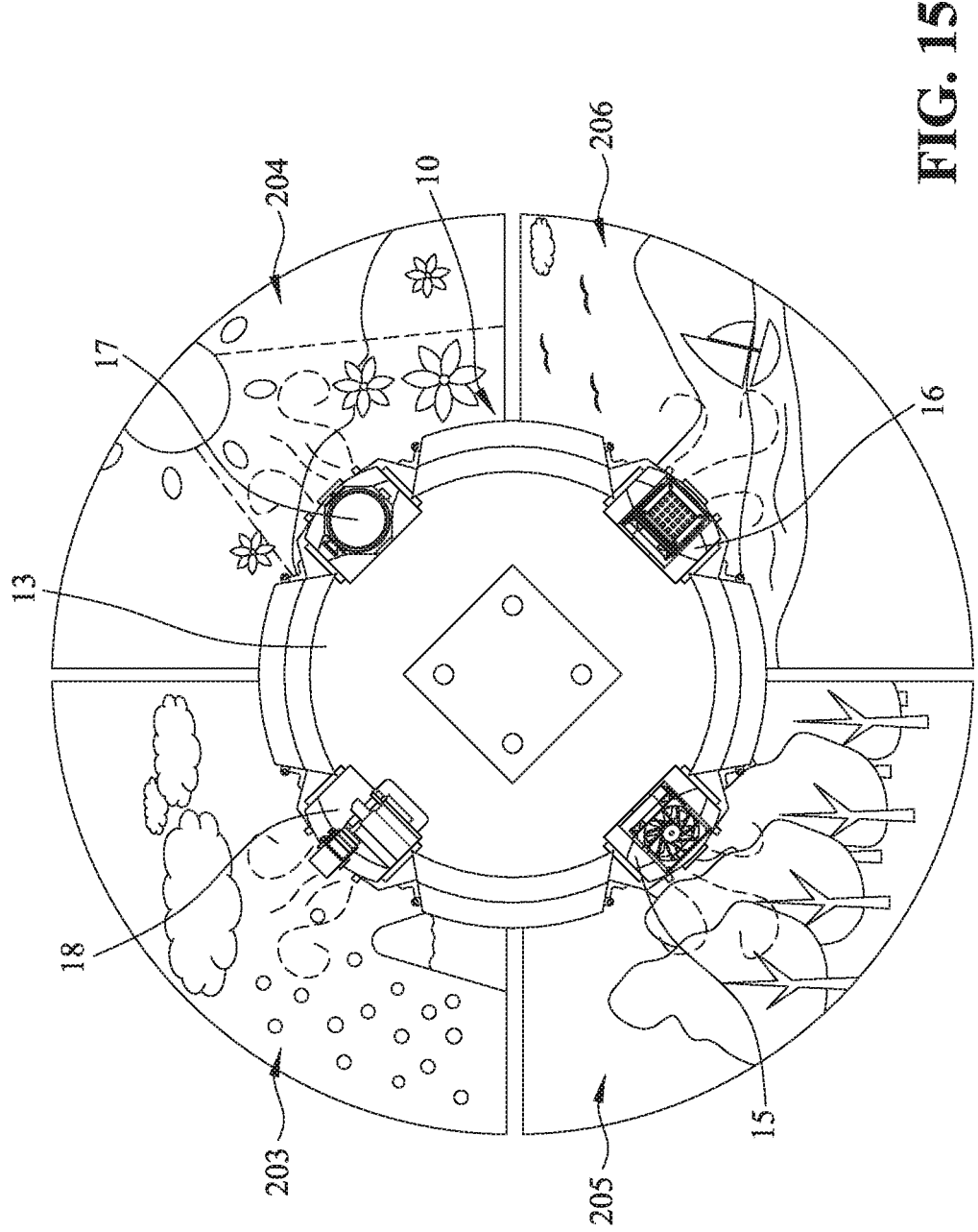
FIG. 15 is a schematic diagram illustrating the virtual reality multi-sensory system of the present invention simulating a plurality of environments.
Figure 16:
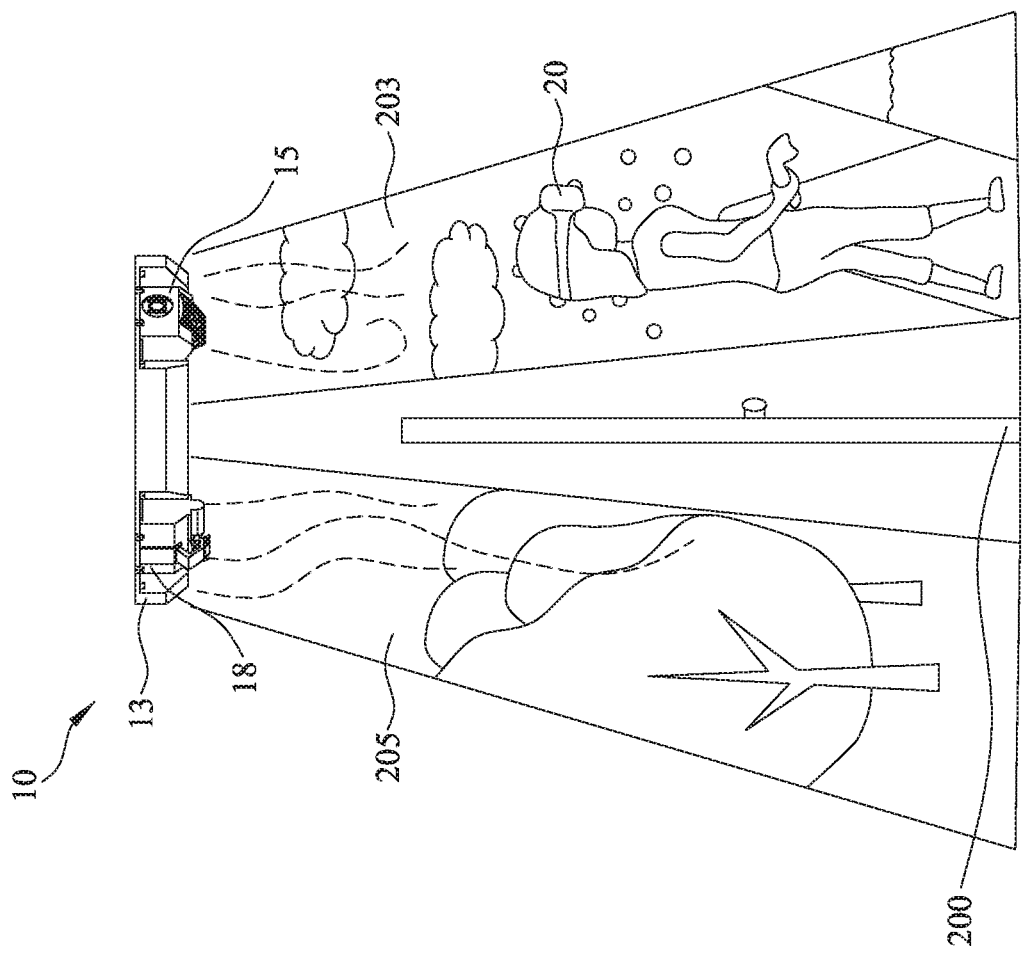
FIGS. 16 to 18 are schematic diagrams illustrating continuous actions of the virtual reality multi-sensory system of the present invention when simulating a changing environment.
Figure 17:
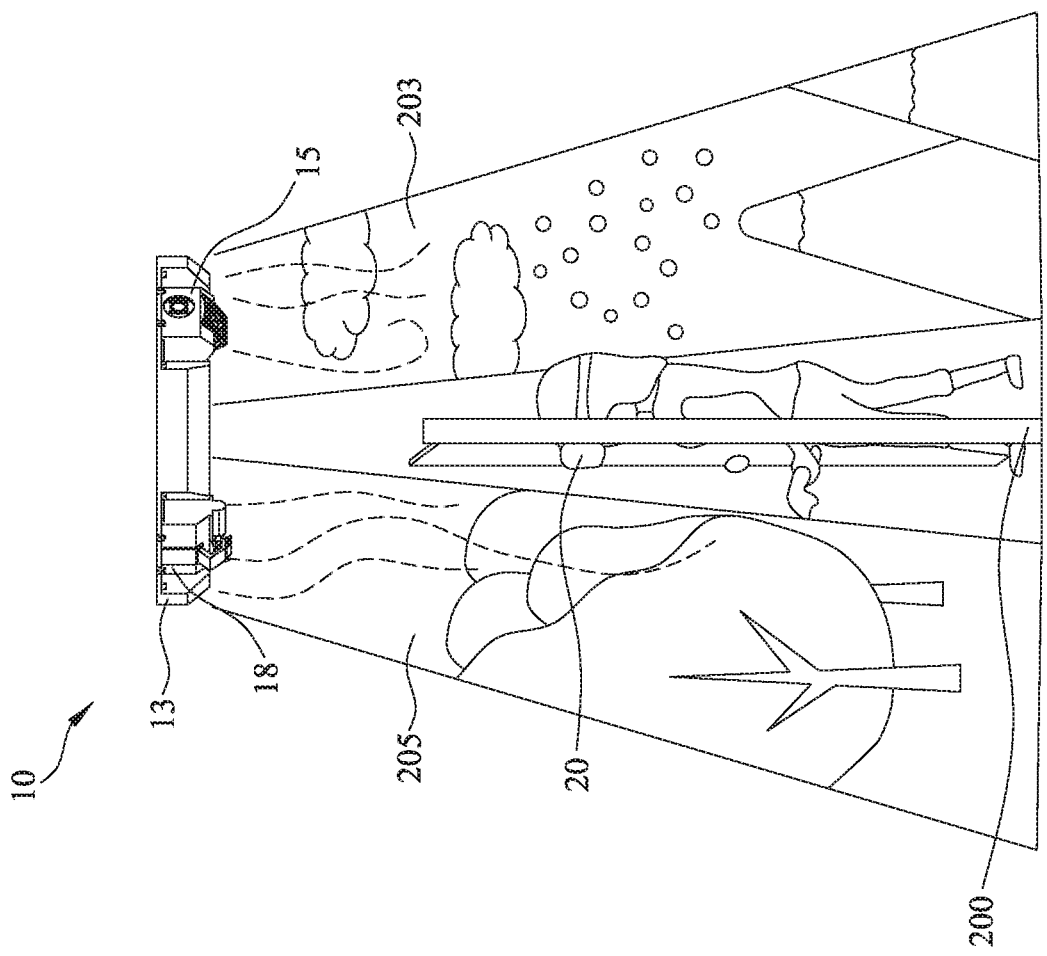
Figure 18:
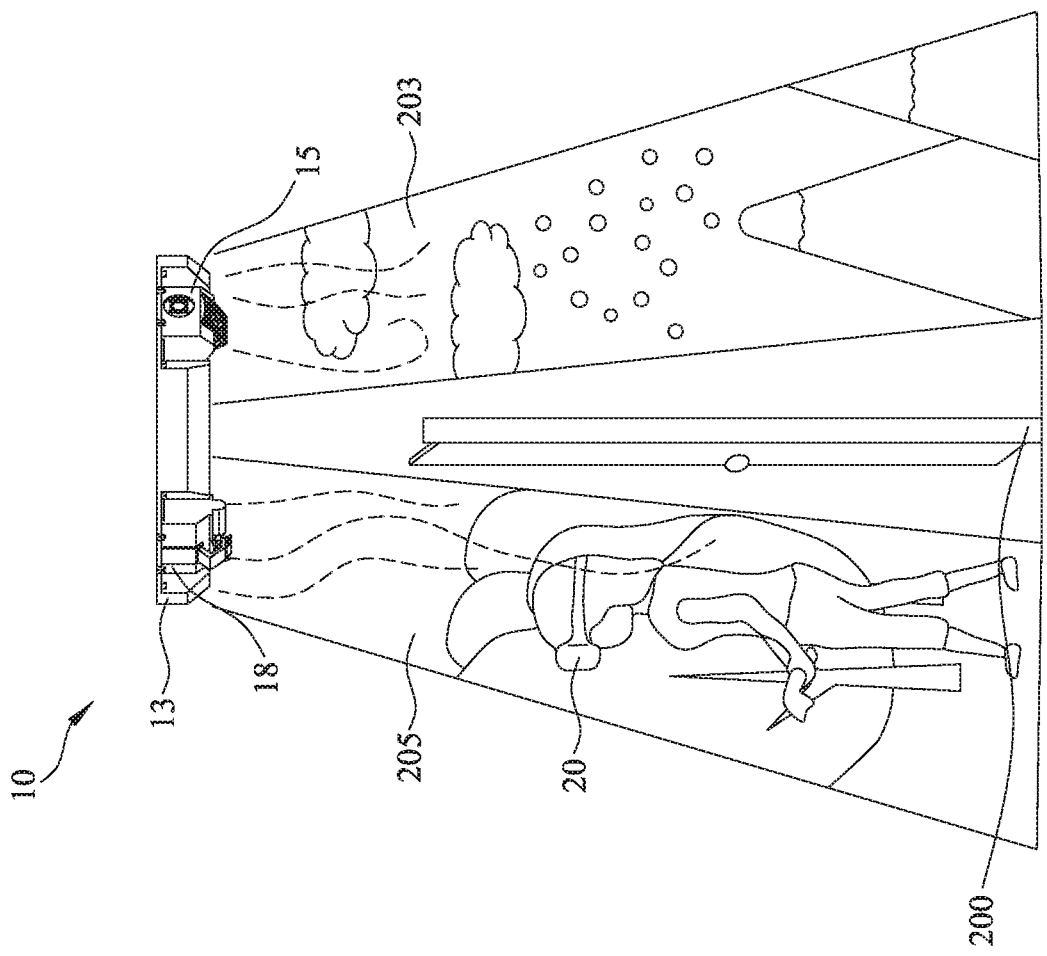

The embodiment shown in FIG. 15 illustrates a provision of four kinds of outdoor environment, including a snowing mountain 203, a cherry blossom forest 204, a maple forest 205 and a beachside 206. FIG. 16 illustrates the specific environment simulated by the virtual reality multi-sensory system of the present invention being the snowing mountain 203, in which the user perceives as he is walking along the snowing mountain 203. FIG. 17 illustrates that a picture of the display screen 22 of the head-mounted multi-sensory device 20 appears with a simulated anywhere door 200, and the user is passing through the simulated anywhere door 200. FIG. 18 illustrates that the user has passed the simulated anywhere door 200, entering another specific environment which is the maple forest 205. The liquid mist module 18 of the overhang rotatable multi-sensory device 10 supplies a simulated scent of the maple forest 205; the nose of the user perceives the smell of the maple forest 205, by which his perception of the maple forest 205 is enhanced as he is in a forest maple 205 in Canada.

It should be noted that, when the user is standing at the simulated anywhere door 200, the liquid mist module 18 of the overhang rotatable multi-sensory device 10 stop operating, preventing the smell of the maple forest 205 and the snowing mountain 203 from mixing together, such that the user perceives a progressive transformation when the specific environment perceived is changing.

Besides the aforementioned specific environments, the virtual reality multi-sensory system according to the present invention is also capable of providing the user other outdoor specific environments as various selections.

In conclusion, the positioning module 24 of the head-mounted multi-sensory device 20 tracks and locates the real-time coordinate 101 of the user, allowing the overhang rotatable multi-sensory device 10 to rotate with the movement of the user, such that the affected area of the wind module 15, the hot air module 16, the heat module 17 and the liquid mist module 18 faces to the user at all times to provide a single or multiple feedbacks such as wind, hot air, heat radiation, liquid spraying, mist vapor, cold air and olfactory feedbacks etc. The head-mounted multi-sensory device 20 may provide visual and auditory feedbacks. As a result, the virtual reality multi-sensory system of the present invention truly simulates image, sound effect, air flow, humidity, temperature, and smell of the specific environment, to stimulate the senses of sight, hearing, smell, and touch etc. of the user, thereby allowing the user to have an immersive experience in the simulated environment and avoiding increasing physical burden on the user's body.

In one embodiment, the multi-sensory module 101 may include one or more of the wind module 15, but does not include the hot air module 16, the heat module 17 and the liquid mist module 18. As a result, such embodiment only provides wind blowing feedback.

In one embodiment, the multi-sensory module 101 may include one or more of the hot air module 16, but does not include the wind module 15, the heat module 17 and the liquid mist module 18. As a result, such embodiment only provides hot air feedback.

In one embodiment, the multi-sensory module 101 may include one or more of the heat module 17, but does not include the wind module 15, the hot air module 16, and the liquid mist module 18. As a result, such embodiment only provides radiation feedback.

In one embodiment, the multi-sensory module 101 may include one or more of the liquid mist module 18, but does not include the wind module 15, the hot air module 16, and the heat module 17. As a result, such embodiment only provides liquid and mist spraying feedback and olfactory feedback.

Although the present invention has been described with reference to the preferred embodiments thereof, it is apparent to those skilled in the art that a variety of modifications and changes may be made without departing from the scope of the present invention which is intended to be defined by the appended claims.

What is claimed is:

1. A virtual reality multi-sensory system, comprising an overhang rotatable multi-sensory device installed above a user, a head-mounted multi-sensory device, and a remote control wirelessly connected to the overhang rotatable multi-sensory device and the head-mounted multi-sensory device, wherein the overhang rotatable multi-sensory device comprises:

a fixed base, comprising a hanging portion and a base portion, the hanging portion configured to be disposed on a ceiling, underneath a roof or a beam, or an indoor place above a head of the user, the hanging portion having a plurality of support legs at a bottom of the hanging portion, a bottom of each of the support legs secured onto a top of the base portion;

a rotatable base rotatably disposed on the fixed base;

a control unit disposed within the rotatable base or the fixed base;

a driving device disposed between the fixed base and the rotatable base, electrically connected with the control unit, and controlled by the control unit to drive the rotatable base to rotate with respect to the fixed base; and a multi-sensory module including a wind module, a hot air module, a heat module and a liquid mist module, wherein, the wind module is disposed on the rotatable base, electrically connected with the control unit, and controlled by the control unit to generate winds with varied volumes; the hot air module is disposed on the rotatable base, electrically connected with the control unit, and controlled by the control unit to generate winds with varied volumes and varied temperatures; the heat module is disposed on the rotatable base, electrically connected with the control unit, and controlled by the control unit to generate radiation with varied temperatures; and the liquid mist module is disposed on the rotatable base, electrically connected with the control unit, and controlled by the control unit to spray liquid with varied amounts and/or mist with varied drop sizes, wherein, the winds generated by the wind module, the winds generated by the hot air module, the radiation generated by the heat module, and the liquid sprayed by the liquid mist module are individually directed downward to the user wherein the head-mounted multi-sensory device comprises:

a helmet;

a display screen disposed at a front side of the helmet to display a scene image of a specific environment selected by the user;

two earphones each disposed at a lateral side of the helmet to play a scene sound effect of the specific environment selected by the user; and a positioning module disposed within the helmet and connected with the control unit of the overhang rotatable multi-sensory device via wireless communication protocol, to locate a real-time coordinate of a position of the user and transfer the real-time coordinate to the control unit of the overhang rotatable multi-sensory device;

wherein, by utilizing the real-time coordinate, the control unit of the overhang rotatable multi-sensory device controls the driving device to drive the rotatable base to rotate with respect to the fixed base, such that at least one of the wind module, the hot air module, the heat module and the liquid mist module is continuously operated facing the user, wherein the remote control is connected with the control unit, the display screen, the two earphones and the air flow guiding module via wireless communication protocol, wherein the user uses the remote control to switch for the specific environment comprising a desert, a snow field, a snowing mountain, a cherry blossom forest, a maple forest and a beachside, and wherein the display screen shows a simulated anywhere door for the user to pass, and the scene image is switched to the desert, the snow field, the snowing mountain, the cherry blossom forest, the maple forest or the beachside in collocation with the wind module, the hot air module, the heat module and the liquid mist module.

2. The virtual reality multi-sensory system according to claim 1, wherein the rotatable base is provided with a plurality of installing recesses at its external side, the installing recesses are spaced apart from each other; and the wind module, the hot air module, the heat module and the liquid mist module are individually disposed in the installing recesses.

3. The virtual reality multi-sensory system according to claim 2, wherein the wind module includes a fan base and a fan; the fan base is disposed in one of the installing recesses; the fan of the wind module is pivotally disposed on the fan base, rotatable up and down with respect to the fan base, and electrically connected with the control unit, and the fan of the wind module includes a plurality of blades; and the control unit controls rotation angle of the fan and rotation speed of the blades of the wind module, to generate winds with varied angles and volumes.

4. The virtual reality multi-sensory system according to claim 2, wherein the hot air module includes a hot air base, a fan and a heater; the hot air base is disposed in one of the installing recesses; the fan of the hot air module is pivotally disposed on the hot air base, rotatable up and down with respect to the hot air base, and electrically connected with the control unit, and the fan of the hot air module includes a plurality of blades; the heater is disposed at an outlet of the fan of the hot air module and electrically connected with the control unit; and the control unit controls rotation angle of the fan and rotation speed of the blades of the hot air module and heating temperature of the heater, to generate winds with varied angles, volumes and temperatures.

5. The virtual reality multi-sensory system according to claim 2, wherein the heat module includes a heating base and a heat source; the heating base is disposed in one of the installing recesses; the heat source is pivotally disposed on the heating base, rotatable up and down with respect to the heating base, and electrically connected with the control unit; and the control unit controls rotation angle and temperature of the heat source, to generate radiation with varied angles and temperatures.

6. The virtual reality multi-sensory system according to claim 2, wherein the liquid mist module includes a liquid tank, a sprinkler and an atomizer; the liquid tank contains liquid; the sprinkler and the atomizer are individually connected to the liquid tank and electrically connected with the control unit; and the control unit controls the sprinkler to apply pressure on the liquid in the liquid tank and spray the liquid with varied amounts outward, and the control unit controls the atomizer to atomize the liquid in the liquid tank and spray mist with varied drop sizes outward.

7. The virtual reality multi-sensory system according to claim 6, wherein the sprinkler and the atomizer are each provided with a liquid outlet opening downward; the liquid mist module further includes a plurality of mist guiding blades pivotally disposed at the liquid outlet of the atomizer, rotatable with respect to the atomizer in the directions toward and away from a central axis of the rotatable base, and electrically connected with the control unit; and the control unit controls rotation angle of the mist guiding blades, to guide a flowing direction of the mist.

8. The virtual reality multi-sensory system according to claim 1, wherein the fixed base includes a hanging portion and a base portion; the hanging portion has a plurality of support legs at its bottom, bottom ends of the support legs are secured on top of the base portion; the rotatable base is disposed to surround an external side of the base portion of the fixed base and has a ring gear on a top end thereof; the driving device includes a motor, a speed reducer, a drive shaft, and a planetary gear set; the motor is disposed on the base portion and electrically connected with the control unit; the speed reducer is disposed on the base portion and combined to an output shaft of the motor; the planetary gear set includes a sun gear and a planet gear; the drive shaft is combined with the speed reducer and penetrates through a central axis of the sun gear; the planet gear is engaged with the sun gear and the ring gear; the control unit controls the output shaft of the motor to rotate and transmit dynamic power to the drive shaft after the output shaft of the motor is decelerated by the speed reducer; and the drive shaft drives the sun gear to rotate, the sun gear drives the planet gear to rotate, and then the planet gear drives the rotatable base to rotate via the ring gear.

9. The virtual reality multi-sensory system according to claim 1, wherein the head-mounted multi-sensory device further includes an air flow guiding module, the air flow guiding module includes an air purifier and two flow guiding fans; the air purifier is disposed in the middle of the front side at a bottom of the helmet; the two flow guiding fans are disposed at the bottom of the front side of the helmet and each is located at a lateral side of the air purifier; the two flow guiding fans guide liquid vapor and/or mist vapor mixed by the liquid and/or the mist sprayed from the liquid mist module and an external air to a nose of the user, thereby generating an olfactory feedback; after the overhang rotatable multi-sensory device, the display screen and the two earphones complete simulating the specific environment, the two flow guiding fans guide the external air through the air purifier for purifying, to remove a smell simulated in a space and provide clean air to the nose of the user, thereby preventing the smell of a previous space from remaining and mixing with that of a new space.

* * * * *